G. K. BABCOCK.
LAMP BRACKET FOR POWER DRIVEN VEHICLES.
APPLICATION FILED FEB. 21, 1913.
1,082,618.
Patented Dec. 30, 1913.
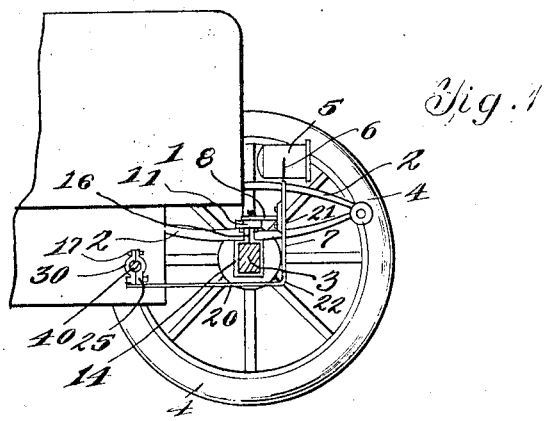
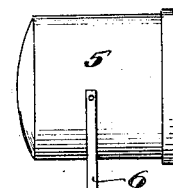
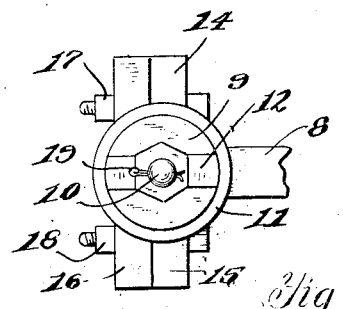
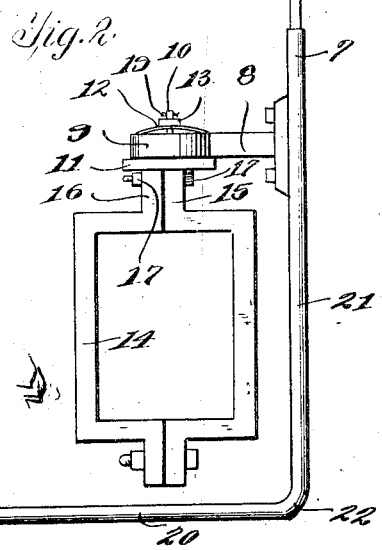
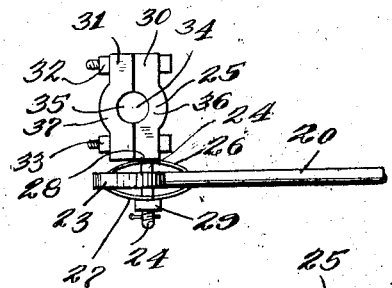
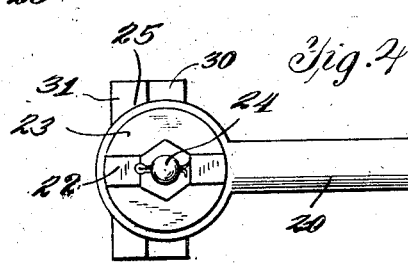
WITNESSES
INVENTOR
George K. Babcock,
BY
ATTORNEY

UNITED STATES PATENT OFFICE.

GEORGE K. BABCOCK, OF MILLPORT, NEW YORK.

LAMP-BRACKET FOR POWER-DRIVEN VEHICLES.

1,082,618.  Specification of Letters Patent.  Patented Dec. 30, 1913.

Application filed February 21, 1913. Serial No. 749,931.

*To all whom it may concern:*

Be it known that I, GEORGE K. BABCOCK, a citizen of the United States, residing at Millport, in the county of Chemung and State of New York, have invented certain new and useful Improvements in Lamp-Brackets for Power-Driven Vehicles, of which the following is a specification.

This invention relates to automobile lamps and more particularly to brackets for supporting said lamps and mechanism for automatically operating said brackets simultaneously with the guiding or steering of the front wheels in a power driven vehicle.

The primary object of this invention is the provision of lamp brackets for automobiles or like vehicles which are connected with the mechanism for steering the wheels of the vehicle in such manner as to direct the rays of light dispensed by the lamp in the same direction which the wheels are steered, thus illuminating the road or passage to be traveled by the vehicle at all times.

Another object of this invention is to provide an adjustable clamping means for attaching the lamp brackets to the steering rod and front end of the vehicle so that the same may be applied to any type of vehicle now in use without necessitating any alterations in the construction of the lamp bracket or the vehicle, and to construct each bracket separately, so that they may be placed in any position desired upon the axle and steering rod of the vehicle.

A still further object of this invention is to construct this improved bracket in such a manner that when the same is connected to a vehicle it will be operated directly by the steering mechanism for the wheels of the vehicle thereby eliminating any possibility of the lamps failing to turn simultaneously or in unison with the wheels of the vehicle.

With the foregoing and other objects in view, this invention consists of the novel construction, combination and arrangement of the various parts, hereinafter more specifically described, illustrated in the accompanying drawings, and claimed.

In describing my invention in detail, reference is had to the accompanying drawings wherein like characters designate like or corresponding parts throughout the several views of the drawings, and in which, Figure 1 is a view showing a part of the front of an automobile having an improved lamp bracket attached thereto; Fig. 2 is a detail elevation view of the lamp bracket and the means for connecting the same to the front axle and the steering rod of the vehicle; Fig. 3 is a top plan view of a portion of the bracket showing the swiveled connection between the same and the clamp for attaching the bracket to the front axle; and, Fig. 4 is a view similar to Fig. 3 only showing the swiveled connection of the bracket supporting rod and the clamp for connecting the same to the steering rod of the vehicle.

In referring to the drawings by numeral 1 designates the front end of the engine hood of an automobile, 2 the springs of the vehicle, and 3 the front axle. Mounted upon the front axle are wheels 4 of the automobile, only one of which is shown in the drawings, the other end of the axle being broken away to clearly show the lamp bracket and the means of mounting the same.

The lamp 5 which may be of any desired type of lamp or head-light such as is now commonly used, is mounted in the forked ends 6 of the main bracket 7, which main bracket 7 has connected thereto at a short distance below its upper end a second or auxiliary bracket 8. The outer end 9 of the auxiliary bracket 8 is substantially circular in shape and is swivelly mounted upon the bolt 10 which is securely connected to the plate 11 in any suitable manner. A flat leaf spring 12 is disposed between the nut 13, which is mounted upon the bolt 10, and the upper surface of the circular end 9 of the auxiliary bracket 8, thereby increasing the efficiency of the swiveled connection between the bracket 8 and the plate 11. The plate 11 is connected to the upper end of the clamp 14. The clamp 14 is preferably constructed of a single piece of resilient metal which is shaped to conform to the shape of the majority of front axles commonly used on motor vehicles and has its two upper ends 15 and 16 securely held together by means of bolts 17 and 18 which are inserted therethrough. A split key 19 is inserted through an opening in the end of the bolt to prevent the nut 13 from working off the bolt.

The main bracket 7 is preferably constructed of a rod which has a portion 20 thereof bent at right angles to the vertical part 21 at 22. The lateral portion 20 of the main bracket 7 extends rearwardly from the front axle 3 of the vehicle and has its end 23 circular in shape. This end 23 is swivelly connected to an extension 24 of the clamp 25. Flat springs 26 and 27 are mounted upon the extension 24 and have their ends contacting with the circular end 23 of the rod 20. The middle portion of the springs 26 and 27 contact respectively one with the edge 28 of a clamp 25 and the other with a nut 29 which is mounted upon the extension 24. These springs form a cushioning means for the rod 20 and the main bracket 7 whereby the shocks occasioned by the vehicle passing over rough places in the road are partially absorbed as well as aiding the swiveled motion of the bracket 7.

The clamp 25 is constructed of two sections 30 and 31 which are bolted together by means of the bolts 32 and 33. These two sections 30 and 31 have semi-circular cut-out portions 34 and 35 centrally located therein and slight projections 36 and 37 adjacent said cut-out portions for strengthening the sections 30 and 31 and preventing their breaking or snapping in two when strained or a sudden shock is administered to the same. The cut-out portions 34 and 35 receive the steering rod 40 of the vehicle which is in turn connected to the steering wheel (not shown).

The operating of the steering wheel of the vehicle for the turning of the wheels 4 in any desired direction will cause the lamps 5 to turn simultaneously therewith because of the swiveled connection between the steering rod 40 and the front axle 3 and the main bracket 7.

In practical fields, certain minor details of construction, combination and arrangement of parts may necessitate alterations to which the patentee is entitled provided said alterations are comprehended within the scope of what is claimed.

What is claimed is:—

1. In a lamp turning mechanism, the combination with a vehicle having a front axle and a steering rod, of a main bracket having its upper end forked, a lamp carried by said forked end, an auxiliary bracket carried by said main bracket below the forked end, means for securing said auxiliary bracket to said front axle, and means swivelly connecting said main bracket and said steering rod whereby the lamp will be turned in unison with the movement of the steering rod.

2. In a lamp turning mechanism, the combination with a vehicle having a front axle and a steering rod, of a main bracket having its upper end forked and its lower end disposed in a horizontal plane, a lamp carried by said forked end, an auxiliary bracket attached to said main bracket below said forked end, a clamp swivelly connected to said auxiliary bracket for clamping the same to said axle, and a second clamp swivelly connected to the terminal end of said horizontal portion for connecting said main bracket to said steering rod for operating said main bracket synchronously with said steering rod.

3. In a lamp turning mechanism, the combination with a vehicle having a front axle and a steering rod, of a main bracket having its upper end forked and its lower end disposed in a horizontal plane, a lamp carried by said forked end, an auxiliary bracket rigidly attached to said main bracket below said forked end, an adjustable clamp swivelly connected to the auxiliary bracket for attaching the same to said axle, a second clamp swivelly connected to the terminal end of said horizontal portion for connecting said main bracket to said steering rod for operating said main bracket synchronously with the steering rod, and shock absorbing leaf springs interposed between said second clamp and said terminal end.

4. In a lamp turning mechanism, the combination with a vehicle having a front axle and a steering rod, of a main bracket having its upper end forked and its lower end disposed in a horizontal plane, an auxiliary bracket carried by said main bracket, a lamp carried by said forked end, an adjustable clamp swivelly connected to said auxiliary bracket for attaching said main bracket to said front axle, a second clamp swivelly connected to the terminal end of said horizontal portion for connecting said main bracket to said steering rod for operating said main bracket synchronously with said steering rod, the terminal end of said horizontal portion being substantially circular in shape, and leaf springs interposed between said circular end and said second clamp.

5. In a lamp turning mechanism, the combination with a vehicle having a front axle and a steering rod, of a main bracket having one portion thereof bent substantially at right angles to the other portion, an auxiliary bracket carried by said main bracket, an adjustable clamp shaped to conform to the shape of the front axle swivelly connected to said auxiliary bracket for attaching the same to said axle, a second clamp swivelly connected to the terminal end of said angled portion, and shock absorbing leaf springs interposed between said second clamp and said terminal end, said second clamp being attached to said steering rod for operating said main bracket synchronously with the steering rod, and lamp supporting means carried by said main bracket.

6. In a lamp turning mechanism, the combination with a vehicle having a front axle and a steering rod, of a lamp support having one end disposed in a horizontal plane, a bracket attached to said support, means swivelly connected to said bracket for connecting said lamp support to said front axle, and means swivelly connected to the terminal end of said horizontal portion for operating said lamp support synchronously with said steering rod.

7. In a lamp turning mechanism, the combination with a vehicle having a front axle and a steering rod, of a lamp support having one end disposed in a horizontal plane, a bracket attached to said support, means swivelly connected to said bracket for connecting said lamp support to said axle, means swivelly connected to the terminal end of said horizontal portion for operating said lamp support synchronously with said steering rod, and shock absorbing leaf springs interposed between said terminal end and said last named means.

In testimony whereof I affix my signature in presence of two witnesses.

GEORGE K. BABCOCK.

Witnesses:
 JOHN J. BABCOCK,
 HARRIET J. BABCOCK.